INVENTOR:
D. C. MEYERS
BY: *J. H. McCarthy*
HIS AGENT

— # United States Patent Office 3,012,436
Patented Dec. 12, 1961

3,012,436
METER COMPENSATING APPARATUS
Douglas C. Meyers, Metairie, La., assignors to Shell Oil Company, a corporation of Delaware
Filed Mar. 17, 1958, Ser. No. 721,733
3 Claims. (Cl. 73—194)

The present invention relates to apparatus for metering fluids and pertains more particularly to an apparatus for accurately measuring the amount of oil in an oil field production fluid.

In many oil fields water is often produced from wells along with the oil. Prior to delivering the oil to a pipe line, the majort part of the water is removed from the production fluid at the lease tanks or at a point adjacent the well head. This is necessary as most common carrier crude lines do not receive oil having a water content greater than 1%.

After removing the major portion of water from the production fluid, it is necessary to know the amount of admixed water and/or clean oil for bookkeeping purposes, for paying lease royalties, etc. Hence, it is desirable to know accurately the amount of water in the oil passing through a flow meter.

Additionally, it is necessary to apply a temperature correction to the measured volume of clean oil in the production fluid as the volume of the oil changes with temperature, thus introducing an error in the volume of oil measured.

It is therefore an object of the present invention to provide a metering apparatus adapted to measure the amount of the clean oil in an oil well production fluid by compensating for the amount of water present while at the same time introducing a correction factor whenever the temperature of the oil is above or below a predetermined standard temperature.

Another object of the present invention is to provide a metering apparatus for correcting the volume measured for temperature and changes in water content present in a manner such that the full range of the temperature and water-measuring and correcting devices may be employed to obtain better resolution and accuracy for the recorded volumes of clean oil.

These and other objects of this invention will be understood from the following description taken with reference to the drawing, wherein.

Figure 1:
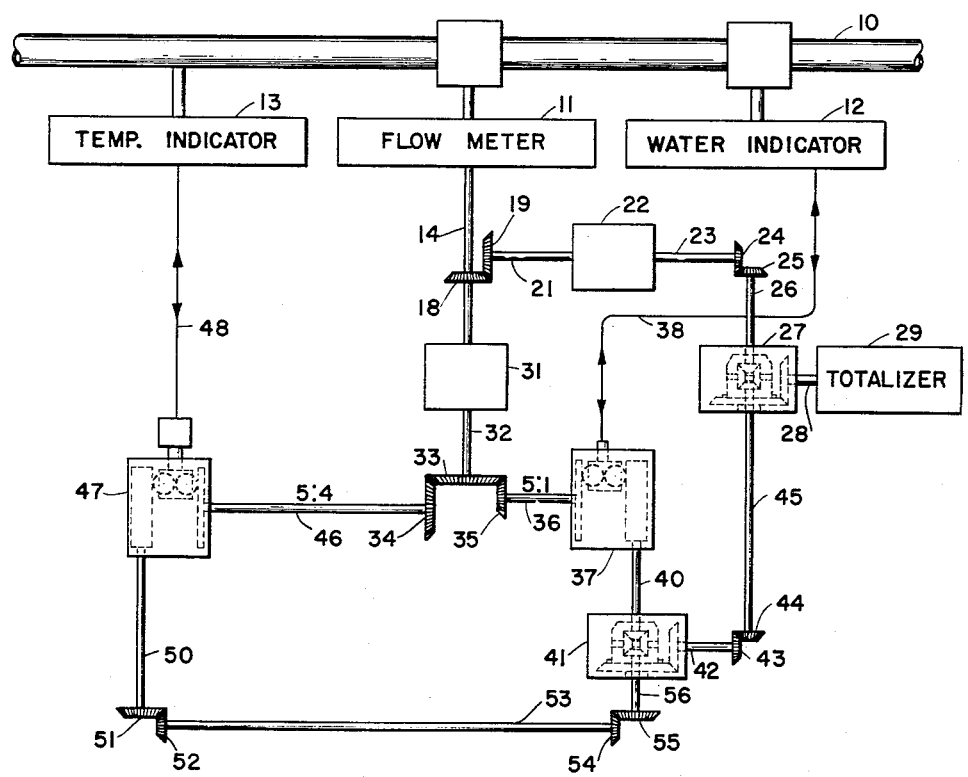
FIGURE 1 is a diagrammatic view showing the arrangement of the component parts of the present metering apparatus.
Figure 2:
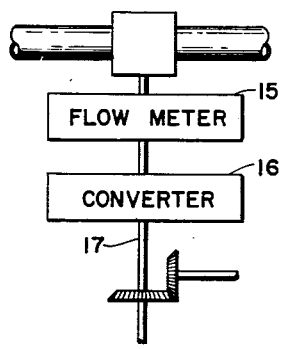
FIGURE 2 is a diagrammatic view illustrating another arrangement of the flowmeter of the present metering apparatus.

A pipe line 10 as illustrated in FIGURE 1 as being provided with a flowmeter 11, a water-indicating or sensing device 12 and a temperature-sensing and indicating device 13. The flowmeter 11 is preferably a positive-displacement type flowmeter having an output shaft 14 whose movement is proportional to the volume of fluid passing through the meter 11. While a flowmeter of the positive-displacement type which puts out a mechanical signal, is preferred, any other type of flowmeter may be provided which puts out an electric, hydraulic or pneumatic signal which is proportional to the flow through the pipe line 10. In the event that a flowmeter of the latter type was employed, the signal from such a flowmeter 15 (FIGURE 2) would be transmitted to a converter 16 whose output shaft 17 would put out a signal similar to shaft 14 of FIGURE 1, which signal was proportional to the volume of fluid passing through the flowmeter.

The output signal of the flowmeter 11 is split by a pair of meshing gears 18 and 19. The gear 19 is mounted on the input shaft 21 of a speed-altering device or speed increaser 22 having an output shaft 23 provided with a gear 24 thereon which meshes with a gear 25. Gear 25 is secured to a shaft which is one of two input shafts of a differential gear unit 27. The output shaft 28 of the differential gear unit 27 is connected to the input shaft of a totalizer or volume indicating device 29.

The output shaft 14 of the flowmeter is also connected to or forms the input shaft of a speed-altering device or speed reducer 31 whose output shaft 32 is provided with a gear 33 which meshes with a pair of gears 34 and 35. Gear 35 is mounted on the input shaft 36 of a ball-and-disc integrator. The other signal to the integrator 37, i.e. the signal that alters the position of the ball mechanism therein, is provided by a signal transmission line 38 which is connected between the integrator 37 and the water sensing device 12. In the event that the signal put out by the water-sensing device 12 is a mechanical signal, the signal transmission line 38 may comprise any suitable linkage means between the sensing device 12 and the integrator 37 which would transmit the signal therebetween. In the event that an electric, pneumatic or hydraulic signal is put out by the water indicator 12, the transmission line 38 would be of a type suitable to transmit the desired signal. The output shaft 40 of the integrator 37 is connected to or forms the input shaft of a second differential gear unit 41 whose output shaft 42 is connected through meshing gears 43 and 44 to the other input shaft 45 of the differential gear unit 27.

Gear 34 which is connected through meshing gear 33 to the output shaft 32 of the speed reducer 31, is mounted on the input shaft 46 of a second ball-and-disc integrator 47. The other input signal to the integrator 47, i.e. the signal that alters the position of the ball mechanism therein, is supplied through a signal transmission line 48 of a type suitable to transmit a mechanical, electrical, pneumatic or hydraulic signal between the temperature indicator 13 and the integrator 47. The output shaft 50 of the integrator 47 is mechanically connected as through gears 51 and 52, shaft 53 and gears 54 and 55 to the second input shaft 56 of the differential gear unit 41.

The various gears and shafts and transmission lines shown in FIGURE 1 merely represent physical connection of the various units of the present apparatus whereby the input and output signals of the various units may be transmitted to adjacent units to which they are connected. No specific arrangement of linkage means is considered necessary to the present apparatus. For example, it will be readily seen that, if desired, the integrator 47 could be turned around so that its output shaft 50 would be directly connected to the input shaft 56 of the differential gear unit 41 thereby eliminating gears 51, 52, 54 and 55 as well as shaft 53. In a like manner, at the output shaft 14 of the flowmeter 11, a pair of Selsyns may be employed in a manner well known to the art to transmit a signal from the flowmeter 11 to the rest of the apparatus.

In operation, the flowmeter 11 of the present apparatus measures the total amount of fluid passing through the pipe line 10. In the event that the fluid in the pipe line 10 is oil to be delivered to a common carrier pipe line (not shown), the water content of the fluid will be less than 1%, while in other installations considerably more than 1% of water may be present in the oil. The flowmeter 11 therefore measures the volume of combined oil and water passing through the flowmeter, which volume is uncorrected for any temperature change.

When the output of the flowmeter 11 is split into two outputs by gears 18 and 19, the signal on both shafts 14 and 21 remains at that of the flowmeter 11. The signal transferred from shaft 14 to shaft 21 through gears 18 and 19 is put into a speed increaser 22 whose signal output on shaft 23 is somewhat higher than that of the flowmeter 11, say 102 revolutions for every 100 revolutions of the flowmeter shaft 14. This increase in the flowmeter signal is necessary in order to correct for volume changes due to temperature. When the oil or fluid in the pipe line is very cold, a flowmeter 11 will normally indicate a volume smaller than the volume of the oil if it passed through the flowmeter at a standard temperature of, say, 60° F.

The other output signal of shaft 14 preferably passes through a speed reducer 31 and then is split into two signals by gears 33, 34 and 35. For example, the speed reducer 31 may have an output signal on shaft 32 of five revolutions for every 100 revolutions of the flowmeter 11, while the gears 33, 34 and 35 reduce the 5 revolution signal to 4 revolutions on shaft 46 and 1 revolution on shaft 36 for each 100 revolutions of the flowmeter output shaft 14. The four revolution output on shaft 46 acts as the input signal to the ball-and-disc linear integrator 47 whose ball mechanism is positioned by the temperature sensing device 13 so that the integrator output shaft 50 varies from 0 to 4 revolutions per 100 revolutions of the flowmeter output shaft 14. The temperature range equivalent to this change in output is dependent on the thermal expansion properties of the crude oil being metered. For explanation purposes a correction factor of 0.0005 per degree Fahrenheit will be assumed with a temperature range varying from 20 to 100° F., with 60° being the standard temperature. The 20° F., lower limit causes zero output or revolutions of shaft 50 while the 100° F. upper limit would result in 4 revolutions of shaft 50 for every 100 revolutions of the output shaft 14.

The one revolution output signal on shaft 36 acts as an input signal to the ball-and-disc linear intergrator 37 whose ball mechanism is positioned by the water-sensing device 12 so that the output of the integrator 37 varies from 0 to 1 revolution per 100 revolutions of the output shaft 14 of the meter 11, and corresponds directly to the 0 to 1 percent basic solids and water (BS and W) content of the crude oil being metered.

The outputs of the two integrators 37 and 47, which form the correction factors to be applied to the volume measured by meter 11 after it has been increased by a speed-increaser 22, form the input signals to the differential type gear unit 41 which obtains an algebraic sum of the two input signals and yields an output signal on shaft 42 which varies from 0 to 5 revolutions per 100 revolutions of the meter 11.

The output signal from the differential gear unit 41 serves as one input signal to a second differential gear unit 27 whose other input signal is obtained from the output shaft at a speed increaser 22 which is rotating 102 revolutions per 100 revolutions of the flowmeter output shaft 14. The differential gear unit 27 obtains the algebraic sum of the two inputs thereto and gives an output signal at shaft 28 varying from 97 to 102 revolutions per 100 revolutions of the flowmeter output. The output from this second differential gear unit 27 serves as the input to the totalizer or accumulator 29 which gives a reading of the volume of oil passing through the flowmeter 11 when corrected to 60° F. and 0% water content.

It is to be realized that the ratios on the various gears in the present apparatus, as well as the settings of the speed increaser and speed reducers may be changed as desired to meet the conditions of the particular oil field in which the apparatus is being employed. For example, instead of having a temperature variation of between 20 and 100° F., as assumed hereinabove, another oil field may have a variation of from 20° F. to 120° F. in which case it may be desirable to alter the ratio between shafts 32 and 46. Likewise, the water content of the oil may vary from 0 to 5% or more, instead of 0 to 1% in the examples given above. Whatever ratios are adopted for the present apparatus, the speed increaser 22 must be set at a value high enough to compensate for the maximum change in volume due to temperature. By reducing the speed of the flowmeter shaft output signal before applying corrections thereto for water content and temperature, a reduction in the output signal as represented on shaft 32 increases the usable span or travel of the apparatus in correcting for both the temperature and water content whereas in normal instruments, in general use today, only a limited travel of the correcting devices are actually employed.

I claim as my invention:

1. A metering apparatus for metering a temperature corrected volume of oil in a production fluid consisting of oil and water, said apparatus comprising a conduit through which a mixture of oil and water is flowing, a flowmeter, water-measuring means and temperature-measuring means in communication with the fluid stream in said conduit adapted to put out a signal proportional to the flow, water-content and the temperature of the stream, respectively, a speed increaser, a speed reducer, said speed increaser and speed reducer being operatively connected to said flowmeter, a first ball-and-disc integrator having input terminals connected to the temperature-measuring means and the speed reducer, a second ball-and-disc integrator having input terminals connected to the water-measuring means and the speed reducer, a first differential gear unit connected to said first and second ball-and-disc integrators and combining the signals therefrom, a second differential gear unit connected to said first differential gear unit and the speed increaser to combine the signals therefrom, and a totalizer connected to the second differential gear unit for receiving the output signal therefrom.

2. A metering apparatus for metering a temperature-corrected volume of oil in a production fluid consisting of oil and water, said apparatus comprising a conduit through which a mixture of oil and water is flowing, a flowmeter in said conduit for measuring the gross volume of fluid passing through said conduit, said flowmeter being adapted to put out a signal proportional to the flow, water-measuring and indicating means in communication with the fluid stream in said conduit adapted to put out a signal proportional to the ratio of oil to water content of the stream, temperature-measuring means in communication with the fluid stream in said conduit adapted to put out a signal proportional thereto, a speed increaser, a first differential gear unit, signal transmission means connecting the flowmeter through said speed increaser to the input of said first differential gear unit, a speed reducer connected to said flowmeter, a second differential gear unit, first and second ball-and-disc integrators connected to said speed reducer and also connected to said temperature-measuring and said water-measuring means respectively to transmit simultaneous signals to said second differential gear unit, the output of said second differential gear unit being connected to the input of said first differential gear unit, and totalizer means operatively connected to the output of said first differential gear unit.

3. A metering apparatus for metering a temperature-corrected volume of oil in a production fluid consisting of oil and water, said apparatus comprising a conduit through which a mixture of oil and water is flowing, a flowmeter in said conduit for measuring the gross volume of fluid passing through said conduit, said flowmeter being adapted to put out a signal proportional to the flow, water-measuring and indicating means in communication with the fluid stream in said conduit adapted to put out a signal proportional to the ratio of oil to water content of the stream, temperature-measuring means in communication with the fluid stream in said conduit adapted to put out a signal proportional thereto, an output shaft on said flowmeter, a speed increaser, first signal transmission means connecting said flow meter shaft to said speed increaser, a first differential gear unit, second signal transmission means connecting the output shaft of said speed increaser to one input shaft of said first differential gear unit, a speed reducer having an input shaft and an output shaft, third signal transmission means connecting the flow meter shaft to the input shaft of said speed reducer, fourth signal transmission means connected to the output shaft of said speed reducer, said fourth signal transmisison means including gear means for splitting the signal from said speed reducer output shaft into first and second signals, first and second ball-and-disc integrators having two input shafts and one output shaft each, said gear means being connected to one input shaft of each of said first and second ball-and-disc integrators, fifth signal transmission means operatively connecting the other input shaft of said first integrator with said temperature-measuring means, a second differential gear unit having two input shafts and an output shaft, linkage means connecting the output shaft of said first integrator with one of the input shafts of said second differential gear unit, sixth signal transmission means operatively connecting the second input shaft of said second integrator with said water-measuring means, the output shaft of said second differential gear unit being connected to the second input shaft of said first differential gear unit, and totalizer means operatively connected to the output shaft of said first differential gear unit.

References Cited in the file of this patent

UNITED STATES PATENTS

| | | |
|---|---|---|
| 1,768,553 | Freeman | July 1, 1930 |
| 2,447,349 | Lehde | Aug. 17, 1948 |
| 2,617,299 | Ennis et al. | Nov. 11, 1952 |
| 2,791,118 | Holz | May 7, 1957 |

FOREIGN PATENTS

| | | |
|---|---|---|
| 614,238 | Germany | June 4, 1935 |